J. W. GRAHAM.
SPRING TIRE.
APPLICATION FILED NOV. 8, 1910.
1,000,796.
Patented Aug. 15, 1911.
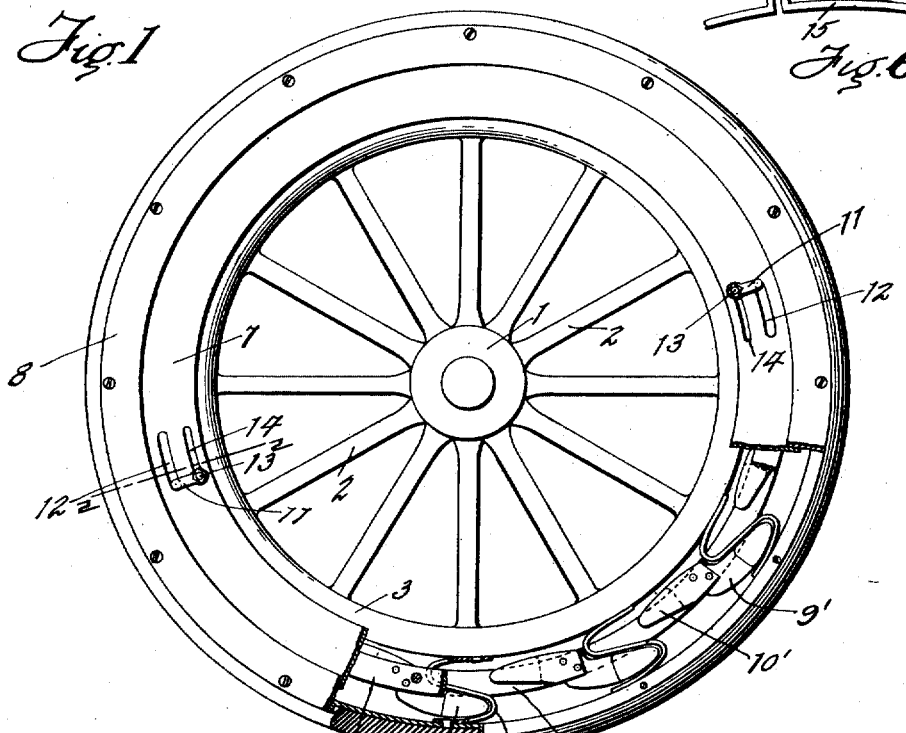
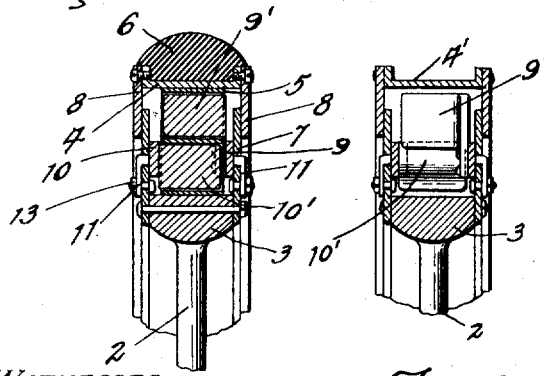
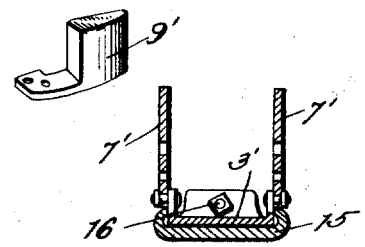
WITNESSES:
INVENTOR
J. W. Graham

UNITED STATES PATENT OFFICE.

JACOB WHITFIELD GRAHAM, OF RARITAN, NEW JERSEY.

SPRING-TIRE.

1,000,796.     Specification of Letters Patent.     Patented Aug. 15, 1911.

Application filed November 8, 1910. Serial No. 591,339.

*To all whom it may concern:*

Be it known that I, JACOB WHITFIELD GRAHAM, a citizen of the United States, residing at Raritan, in the county of Somerset and State of New Jersey, have invented certain new and useful Improvements in Spring-Tires, of which the following is a specification.

This invention involves improvements in that type of spring tires for vehicles utilizing spaced annular members between which are interposed resilient or yielding devices adapted to form the resiliency or cushioning effect of the wheel structure.

The invention resides particularly in the peculiar mounting of the springs and special means coacting therewith whereby to adjust the springs according to the particular service which may be required of the wheel under practical conditions of use.

For a full understanding of the present invention reference is to be had to the following description, and to the accompanying drawings in which—

Figure 1 is a side elevation of a wheel embodying the invention, portions of the side plates being broken away to show the arrangement of the springs and means associated therewith for adjustment purposes; Fig. 2 is a section taken about on the line 2—2 of Fig. 1; Fig. 3 is a section somewhat similar to Fig. 2, but showing the stops in elevation and the springs and tire being omitted; Fig. 4 is a combined view showing the stop members in perspective; Fig. 5 is a sectional view embodying a modification of the invention; and Fig. 6 is a side view of certain parts shown in Fig. 5.

Throughout the following detailed description and on the several figures of the drawing, similar parts are referred to by like reference characters.

The principles in the structure involved in the present invention are embodied in the construction of a tired wheel of the resilient type or in the provision merely of a spring tire adapted to be applied to ordinary wheel constructions in lieu of the common rubber tires which are articles of large expense in the operation of vehicle wheels to which they are applied.

Describing the invention specifically, and referring to the drawing, 1 denotes the hub of the wheel, 2 the spokes, and 3 the inner rim of the spring tire, said rim constituting the felly of the wheel, in one embodiment of the invention. Encircling the rim or felly 3 is a larger outer rim 4 and between the two rims 3 and 4 are interposed the springs 5, the latter being of somewhat S form. Preferably, the outer rim 4 will be provided with an annular groove 4' to form a seat for a rubber tread 6, should it be desired to employ the latter for the purpose of producing a yielding tire of noiseless construction. However, it is to be understood that the rim 4 may be formed in any desired manner.

To the opposite sides of the inner rim 3 are secured the annular plates 7 and in like manner, the outer rim 4 has annular plates 8 secured thereto at opposite sides, the plates 8 overlapping the plates 7 and being adapted for movement relative thereto, as the springs 5 yield.

The means employed for adjusting the tension of the springs 5, and under certain conditions, for rendering said springs inoperative to afford resiliency, comprises rings 9 and 10 mounted upon the inner annular plates 7 and arranged on the inner sides of the latter. The ring 9 is of flat metal and carries a plurality of stops 9' movable circumferentially with said ring into the space between the sides of the outer folds of the springs 5. In like manner the ring 10 carries stops 10' similar to the stops 9', the stops 10' however being movable into the spaces between the innermost folds of the springs 5. Under actual conditions of service should it be desired to decrease the resiliency of the tire, or the yielding movement of the outer rim 4 with respect to the inner rim 3, the stops 10' will be moved into engagement with the portions of the springs 5 adjacent to which they are arranged. Assuming that the outermost stops 9' do not engage the springs, it will be apparent that when the stops 10' coact with the springs in the manner above specified, the resiliency of the last mentioned parts is reduced about one half. It may be observed, however, that both the stops 9' and 10' may be moved so as to enter the spaces between the folds of the springs 5, to a greater or less extent according to the desire of the operator, whereby the folds may be stiffened into a substantially rigid structure, or permitted to yield slightly, according to the positions of the stops. When the outermost stops carried by the ring 9 are fully engaged with the outer folds of the springs 5, the outer rim will be held substantially rigid with respect to the inner rim 3.

For the purpose of adjusting the positions of the stops 9' and 10', the rings 9 and 10 will be provided with arms 11 projecting through arc-shaped slots 12 in the space 7, the free ends of the arms 11 being adapted to be positioned by means of fastenings 13 comprising bolts passing through arc-shaped slots 14 in the plates 7, adjustment of the bolts at any point in the length of the slots 14 being sufficient to positively hold the stops carried by the rings 9 and 10 in predetermined positions with respect to the springs 5.

In the modification of the invention illustrated in Figs. 5 and 6, the inner rim 3' is constructed of a size permitting the same to be seated in the channel iron 15 used on rubber vehicles, and said rim 3' will be split and provided with projections at the split ends through which adjusting bolts 16 may pass. The inner plates 7' of the spring tire, equivalent to the plates 7, in the preferred form of the invention, would be secured to flanges of the rim 3'.

Having thus fully described my invention, what is claimed as new is:—

1. In a resilient spring tire, the combination of an inner rim, an outer rim encircling the same, a plurality of spring members interposed between said rims, a device adapted to detachably engage a portion of each spring member for rendering said portion inoperative, and means for operating said engaging device as set forth.

2. In a resilient spring tire, the combination of an inner rim, of an outer rim encircling the same, S-shaped springs interposed between said rims, and means for making rigid a portion of each of said springs for rendering said portion inoperative, as set forth.

3. In a resilient spring tire, the combination of an inner rim, of an outer rim encircling the same, S-shaped springs interposed between said rims, and means to slidably engage one bend of each spring for rendering said bend inoperative, as set forth.

4. A spring tire of the class described, comprising an inner rim, an outer rim spaced therefrom, springs interposed between said rims, plates inclosing the space between the rims and arranged at opposite sides thereof, stops housed between the rims, rings mounted on the plates aforesaid and carrying said stops to permit a movement thereinto and out of engagement with the springs, and arms projecting from the rings through the side plates aforesaid and movable to effect circumferential movement of the rings and the stops carried thereby.

5. A spring tire of the class described comprising an inner rim, an outer rim spaced therefrom, springs interposed between said rims, plates inclosing the space between the rims and arranged at opposite sides thereof, stops housed between the rims, rings mounted on the plates aforesaid and carrying said stops to permit a movement thereinto and out of engagement with the springs, arms projecting from the rings through the side plates aforesaid and movable to effect circumferential movement of the rings and the stops carried thereby, the side plates being provided with arc-shaped slots through which said arms pass, and fastenings adjustable on the side plates to hold the arms in a predetermined position, whereby the stops will also be held in predetermined positions.

In testimony whereof I affix my signature in presence of two witnesses.

JACOB WHITFIELD GRAHAM.

Witnesses:
 JUDSON V. CAIN,
 MAE H. BURNS.

---

Copies of this patent may be obtained for five cents each, by addressing the "Commissioner of Patents, Washington, D. C."